Jan. 17, 1956  A. C. KOELSCH, JR  2,731,200
DOCUMENT SENSING DEVICE
Filed Oct. 5, 1954

*INVENTOR.*
ALBERT C. KOELSCH JR.
BY
AGENT

United States Patent Office

2,731,200
Patented Jan. 17, 1956

1

2,731,200

DOCUMENT SENSING DEVICE

Albert C. Koelsch, Jr., Poughkeepsie, N. Y., assignor to International Business Machines Corporation, New York, N. Y., a corporation of New York Application October 5, 1954, Serial No. 460,335

13 Claims. (Cl. 235—61.11)

This invention relates to a system for simultaneously sensing and storing information recorded on a perforated record and more particularly to such a system wherein a flash tube and cathode ray electrostatic storage tube are employed.

In an electrostatic storage tube system, binary information is stored in the form of charges established on elemental regions of a dielectric target surface. To achieve a two level storage, two distinct charge patterns are developed on the face of the tube and, in the present instance, a dot-line or dot-dash pattern is utilized.

In accordance with the invention, a raster of dash patterns is initially established on the face of a cathode ray tube with the raster conforming with the location of items of information which may be recorded in a perforated record such as a card or tape. The record element to be sensed is superimposed over the face of the cathode ray tube with each possible perforation position in registration with a corresponding dash pattern charge. A radiant energy producing device such as a flash tube is then caused to operate momentarily and the light rays developed thereby pass through the perforations in the record and impinge upon the tube face and upon the corresponding dash charges.

It has been determined that the pattern of each of the dash charges that is exposed to a pulse of radiant energy is caused to change to a dot or to the other charge pattern representing a binary digit so that the arrangement of perforations in the record is simultaneously sensed and recorded by a single operation.

Accordingly, one object of the present invention is to provide apparatus for simultaneously sensing and storing information recorded on an opaque record by means of perforations.

A further object of the invention is to provide a system for sensing and recording binary information on the face of a cathode ray tube by charge pattern variations through optical phenomena.

More specifically, an object of the invention is to provide a system for detecting and simultaneously storing a charge pattern representative of an arrangement of perforations on a record which charge pattern is established on the face of a cathode ray tube by means of a light source.

Other objects of the invention will be pointed out in the following description and claims and illustrated in the accompanying drawings, which disclose, by way of example, the principle of the invention and the best mode, which has been contemplated, of applying that principle.

2

Figure 1:
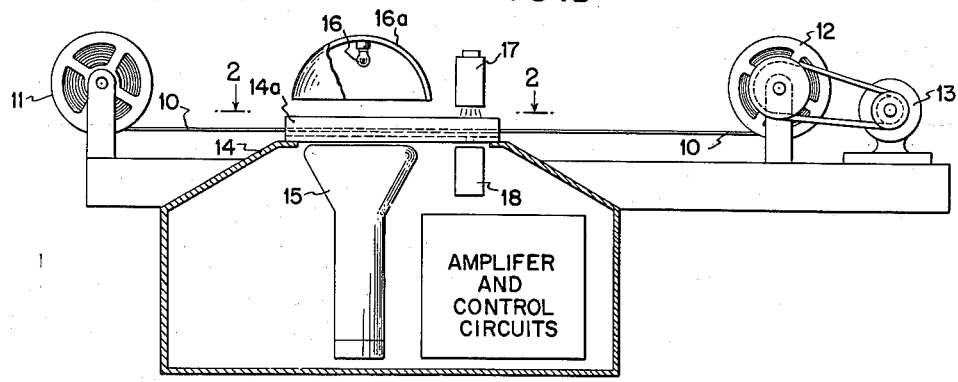
Figure 1 is a schematic representation of the physical layout of the apparatus.

In a conventional electrostatic storage system, a beam of electrons is formed by an electron gun and is directed to the face of a cathode ray tube in accordance with potentials applied to pairs of deflection plates. The tube face or target element is generally coated with a phosphor material to allow the beam position to be observed and the bombarded elemental region of this coating emits secondary electrons when struck by the primary electron beam. The emitted secondary electrons are attracted to a collector electrode which may be a conductive coating on the envelope walls or a screen type electrode. The only current paths associated with an elemental target region comprise the primary and secondary electron flow so that as a consequence, if the number of secondaries departing from a particular region is greater than the number of primaries received, the elemental area tends to become less negative. As a region becomes less and less negative, it approaches the potential of the collector electrode and fewer secondary electrons are attracted from the region until an equilibrium potential condition is reached whereupon the number of secondary and primary electrons are equal. If the deflection plate potentials and consequently the cathode beam is fixed for the brief period of bombardment during which the above action takes place, a dot is stored, but if the beam is moved during the unblank interval, a dash is stored. As previously mentioned, these two charge patterns may be utilized as representing binary digits.

With a series of spaced elemental regions of the target employed for each charge pattern, a determination of which one of the two patterns exist at a prescribed region comprises a bombardment of the region and ascertaining the number of secondary electrons emitted therefrom. If the reading pattern is the same as the stored pattern, there is little change in the charge on the face of the tube when reading occurs, however, if the reading pattern is different, the stored pattern will be destroyed and changed to the reading pattern. A total change of charge on the face of the tube takes place when there is a change in the charge pattern and this may be detected by capacitor action through a fine wire mesh or a transparent conductive coating placed on the outside face of the tube. In the dot-dash system described, reading consists of superimposing the dot pattern and, if a dot charge is present at that position, a negative output signal is obtained. If a dash has been stored, however, reading destroys the dash and in so doing develops a positive output pulse.

It has been determined that with a light source of sufficiently high intensity directed toward the face of the tube, the light causes dashes to change to dots, but not vice versa. While the use of phosphor coating material is not essential either to the storage of charge patterns or the changing of the patterns by light flashes, certain phosphors reduce the amount of light energy required. The minimum energy needed by a flash tube is found to be less using a willimite coating and considerably less with a coating of calcium tungstate, however, other phosphors may be used and it is contemplated that radiant energy within the ultra-violet and infra red ranges may be employed as well.

Figure 2:
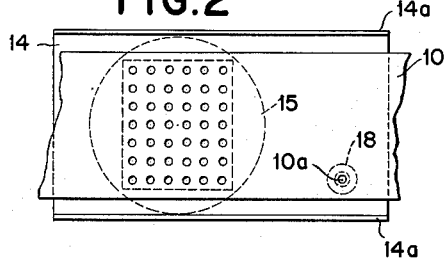
Figure 2 is a view of the apparatus taken along section 2—2 of Figure 1 showing a portion of a perforated tape.

Referring now to Figures 1 and 2, a schematic form of apparatus adapted for sensing perforated tape is illustrated. The tape 10 is held on an idler reel 11 and is unwound by the rotation of a take up reel 12 that is driven by a motor 13. As the tape travels between reels it passes over a guide plate 14 having lateral members 14a that prevent motion of the tape transverse to the direction of tape travel and, when a prescribed tape section is in register with a raster of dash charge patterns on the face of a cathode ray tube 15, a light source 16 is caused to operate and changes those dash patterns positioned directly under perforations to dots.

As shown in Figure 2, plural rows of perforations may be employed with the number of perforation positions in each row corresponding with a number represented in binary notation and the number of rows comprising a binary word which is recorded in each section of field of the tape and sensed in one operation. One control perforation position designated 10–a, located in an otherwise unused row and index position, is employed to detect registration of the group of perforations. For this purpose, a photocell light source 17 and associated photocell 18 are positioned on opposite sides of the tape and in alignment with the control perforation. The sensing of the register control perforation 10a is such as to develop a triggering pulse for the light source 16 through a suitable amplifier network. The light source 16 is located at the focal point of a parabolic reflector 16a so that the light rays falling on the tape are essentially parallel and of uniform intensity.

Figure 3:
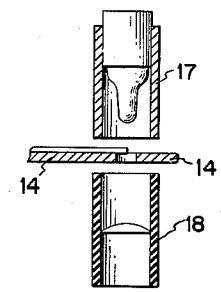
Figure 3 is a view of photoelectric apparatus for detecting registration of a perforated card with a raster of charges established on the face of a storage tube.

It is contemplated that mechanical apparatus may be employed for sensing registration of a section of the tape, for example, a conventional star wheel dropping into a perforation similar to that illustrated for photoelectric sensing. Further, with standard punched record cards rather than a punched paper tape as the sensed medium, registration may be indicated by mechanical travel of pusher levers, by star wheel sensing of a perforation in a predetermined column or row, or by sensing the edge of the card through a photocell arrangement as shown in Figure 3.

Likewise, lenses or other optical means may be employed for focusing and/or concentrating the light from source 16 so that the record medium and storage face of the tube need not be of the same physical dimensions. Ventilating apparatus may also be employed for cooling the flash lamp and for avoiding heat damage to the card or tape.

As a card or a section of a tape arrives at the sensing station and its exact registration is sensed and indicated by a signal from the photocell 18, the light source 16 is caused to operate. Assuming the raster of charges on the storage tube 15 is initially set to dashes, light is admitted to the dash directly beneath each perforation. On the other hand, if there is no hole in the record member, little or no light will be admitted to the dash beneath this section of the card. The dash, if subjected to radiation of sufficient intensity, changes to a dot. The reason for this phenomenon has not been ascertained, however, it is believed to be the result of a photoemissive process.

The sensing operation takes place in an interval comprising only a few microseconds and it is during the time period required for positioning a succeeding tape section or a following card that readout may take place. Readout may be performed serially by row or by column for the entire amount of information, by any individual row or column, or any part of any row or column. The fact that a dot is read indicates that there is a perforation in the sensed record at the particular address while if a dash is read, there has been no perforation at that particular address. Regardless of the portions of the information actually needed, the entire raster must be dashes in preparation for sensing the next card or tape area.

Resetting to dashes is accomplished by always writing a dash after either a dot or dash is read and, as previously mentioned, the reading operation consists of superimposing the dot charge pattern so that the raster must be reset to dashes after the reading operation.

Tape travel or the rate of card feeding need not be constant nor continuous as sensing occurs only when registration is indicated regardless of the time interval between successive registrations. Sensing then is asynchronous, however, reading is necessarily synchronized with the apparatus for which the unit is to function as an input device. If ordinarily used rates are employed, units of information are stored and read out at a rate sufficiently rapid to make regeneration of the stored charge pattern unnecessary, however, with extremely low rates, regeneration may be accomplished in a conventional manner. In any event an outstanding advantage of the system resides in the fact that a buffer storage device is provided which accomplishes both the sensing and storing functions in one operation and which is usable with any opaque document having a systematically arranged array of holes.

Figure 4:
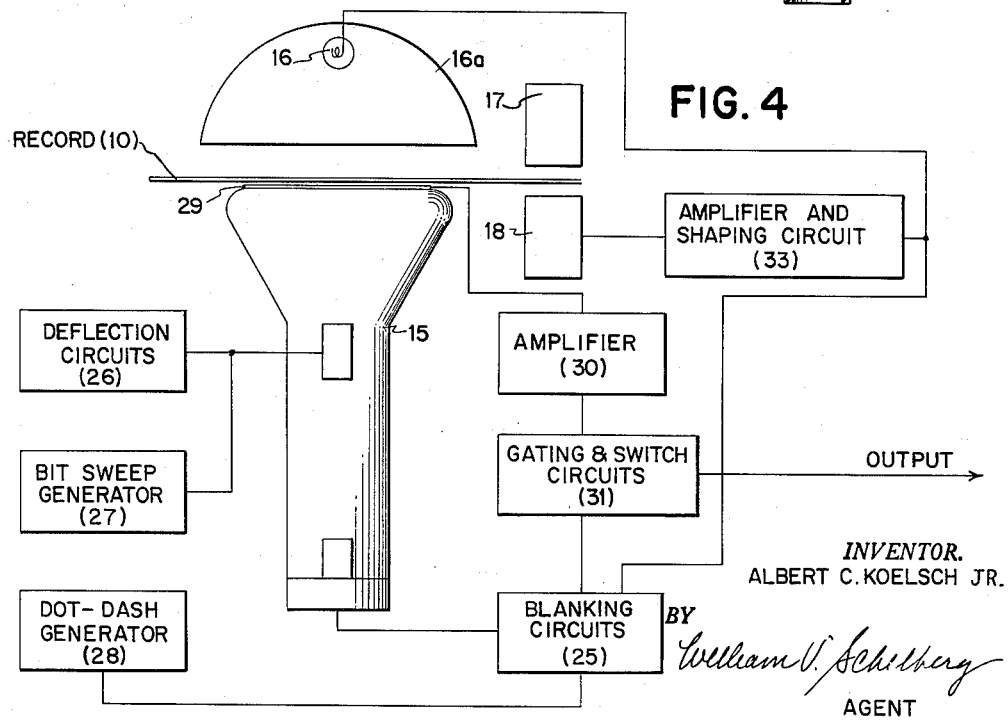
Figure 4 is a block diagram of the electrical system employed with the apparatus.

Having now described the broad aspects of the system, attention is directed to Figure 4 where the electrical system is illustrated in block diagram form. A blanking circuit 25 is provided which functions to cut off the cathode beam while a set of deflection circuits 26 are assuming the correct potentials for directing the beam to a chosen region of the target or tube face. A bit sweep generator 27 varies these deflection potentials to cause a periodic dash pattern sweep during a portion of each operating cycle so that the charge pattern stored is selected by the beam on interval. A dot-dash generator 28 is gated in under control of the blanking circuits 25 during the reading and resetting operations of the cycle. Output signals are derived from a fine mesh screen or transparent conductive coating 29 superimposed over the outside tube face and connected to an amplifier 30, then to a gating and switch circuit 31 which provides the output for use with apparatus such as a computer not shown. The gating or switch circuit 31 may connect the output of the amplifier circuit 30 to the blanking circuit 25 where regeneration is needed.

Each of the circuits shown in block form are illustrated in detail in the copending United States Patent Application for "Electronic Data Processing Machine" Serial No. 417,702, filed March 22, 1954. In particular, the deflection circuits 26 and bit sweep generator 27 are shown in Figures 3g and 3h; the dot-dash generator 28 is shown in Figures 3i, 3j and 3k; the blanking circuit 25 is shown in Figure 4 as elements 420 and 421; the amplifier 29 is shown in Figure 4 as elements 402 and the gating and switch circuits 31 are shown in Figure 4 as elements 404 to 408.

The photoelectric register sensing apparatus previously mentioned is also shown in Figure 4 in block diagram form with the cell 18 shown connected to a network 33 which comprises a conventional amplifier and pulse shaping circuit adapted to provide an output pulse for operating the flash tube 16. This circuit may be of any form well known in the art and as it forms no part of the invention per se, is shown diagrammatically. Should the photocell sensing apparatus be positioned so that registration of the record and charge pattern occur later than the time the light beam from source 17 is either interrupted or unblocked, appropriate delay networks may be employed to regulate the time that the light source 16 is energized. A circuit connection is shown from the amplifier 33 to the blanking circuit 25 and is operable to blank the cathode beam during the interval that the flash tube 16 is operated in order to overcome development of transients in the associated components.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for simultaneously sensing and storing information recorded by perforations in an opaque record comprising, an electrostatic storage tube, a light source directed onto the face of said tube, means for positioning said record intermediate said light source and the face of said tube, means for establishing a raster of dash charges on the face of said tube and in alignment with the perforation positions of said record, and means for causing said light source to operate momentarily whereupon those dash charges located under a perforation are exposed to light and converted to dot charges.

2. Apparatus for simultaneously sensing and storing information recorded by perforations in an opaque record comprising, a cathode ray type electrostatic storage tube, a light source directed onto the charge storage element of said tube, means for positioning said record intermediate said light source and said storage element, means for establishing a raster of dash charges on said storage element and in alignment with the perforation positions of said record, means for sensing registration of said raster of charges and said perforation positions and operable to cause said light source to function momentarily whereupon those dash charges in register with a perforation are exposed to light of predetermined intensity and converted to dot charges.

3. In a combined sensing and buffer storage system, a cathode ray type electrostatic storage tube, means for establishing a raster of dash charges on the face of said tube, said raster conforming with the location of the perforation positions of a record, a light source directed onto the face of said tube, means for positioning successive perforated records intermediate said light source and said tube face, means for sensing the registration of said record and said raster of charges and thereupon causing said light source to function momentarily, and means for sensing changes developed in said raster during the positioning of a succeeding record.

4. A combined record sensing and storage system comprising an electrostatic storage tube, a source of radiation directed onto the charge storage element of said tube, means for establishing a raster of charges of a first type on said element, said raster conforming with the arrangement of perforation positions of a record, means for positioning a perforated record intermediate said source of radiation and said charge storage element and in alignment with said raster, and means for causing said source of radiation to function and thereby cause those charges subjected to the radiation to change to a second type.

5. Apparatus for simultaneously sensing and storing information recorded by perforations in an opaque record comprising, a cathode ray type storage tube, a source of radiation directed onto the charge storage element of said tube, means for establishing a raster of charges of a first type on said storage element, said raster conforming with the perforation positions of said record, means for positioning said record intermediate said source of radiation and said storage element to block radiation therefrom except through perforations, means for detecting registration of said raster of charges and said perforation positions and operable to cause said source of radiation to function momentarily whereupon those charges exposed to radiation are converted to a second type.

6. In a combined sensing and buffer storage system, a cathode ray type storage tube, means for establishing a raster of charges of a first type on the storage surface thereof, said raster conforming with the location of perforation positions of a record, a source of radiation directed onto said storage surface, means for positioning successive perforated records intermediate said radiation source and said storage element, means for detecting registration of said record and said raster of charges and thereupon causing said source to function momentarily, and means for sensing said raster of charges to determine ones converted to a second type during the interval required for registering a succeeding record.

7. Apparatus for simultaneously sensing and storing information recorded by perforations in a tape comprising, a cathode ray electrostatic storage tube, a light source directed onto the charge storage surface of said tube, means for positioning successive tape fields intermediate said light source and said storage surface, means for establishing a raster of dash charges on said storage surface, said raster conforming with the location of perforation positions on each said tape field, means comprising a further light source and photocell for detecting registration of said tape field and said raster of charges and operable to cause said light source to function momentarily, and means for sensing said raster of charges to determine ones converted to dot charges and regenerate all charges to dashes in preparation for a subsequent sensing operation.

8. Apparatus for sensing and storing information recorded by perforations in a succession of record cards comprising, a cathode ray electrostatic storage tube, a pulsed light source directed onto the charge storage surface of said tube, means for establishing a raster of dash charges on said charge storage surface, said raster conforming with the location of perforation positions on each said record, means for positioning successive cards intermediate said light source and said storage surface, means including a constant source of light and a photocell for detecting the position of the leading edge of said cards and consequent registration of said raster of charges with the perforation positions thereof to thereupon cause said pulsed light source to function momentarily, and means for sensing said raster of charges to determine ones converted to dot charges and simultaneously regenerate all charges as dashes during the interval that a succeeding card is brought into position in preparation for sensing.

9. Apparatus for simultaneously sensing and storing information recorded by perforations in opaque records comprising an electrostatic storage tube of the cathode ray type having the inner tube face coated with a phosphor material, means for establishing a raster of discrete charges on said phosphor coating, said raster conforming with the location of perforation positions of said records, a flash tube directed onto said tube face, means for positioning one of said records intermediate said flash tube and said tube face and in register with said charges, means for sensing registration of said card with said raster and causing said flash tube to operate whereupon those charges located under a perforation are changed to another form.

10. Apparatus for sensing and storing information recorded by perforations in a succession of records comprising, a cathode ray storage tube having a charge storage face coated with phosphor material, a flash tube directed onto said storage face, means for establishing a raster of discrete charges on said phosphor coating, said raster conforming with the location of perforation positions of said records, means for positioning successive ones of said records intermediate said flash tube and said storage surface, means including a constant source of light and a photocell for detecting registration of said record with said raster of charges to thereupon cause said flash tube to function, and means for sensing said raster of charges to determine ones converted to another form during the interval that a succeeding record is brought into position for sensing.

11. A combined record sensing and storage system comprising an electrostatic storage tube, a source of radiation directed onto the charge storage element of said tube, means for establishing a raster of charges of a first type on said element, said raster conforming with the arrangement of radiant energy passing positions of a record indicative of data recorded, means for positioning such a record intermediate said source of radiation and said charge storage element and in alignment with said raster, and means for causing said source of radiation to function and thereby cause those charges subjected to the radiation to change to a second type.

12. A combined record sensing and storage system comprising an electrostatic storage tube, a source of radiation directed normal to the charge storage element of said tube, means for establishing a raster of charges of a first type on said element, said raster conforming with the arrangement of radiant energy passing positions of a record indicative of data stored thereby, means for positioning such a record intermediate said source of radiation and said charge storage element and in alignment with said raster, and means for causing said source of radiation to function and thereby cause those charges subjected to the radiation to change to a second type.

13. In a combined sensing and buffer storage system, a cathode ray type storage tube, means for establishing a raster of charges of a first type on the storage surface thereof, said raster conforming with the location of radiant energy passing positions of a record indicative of data recorded therein, a source of radiation directed onto said storage surface, means for positioning successive ones of said records intermediate said source of radiation and said storage element, means for detecting registration of a record and said raster of charges and thereupon causing said source to function momentarily, and means for sensing said raster of charges to determine ones converted to a second type during the interval required for registering a succeeding one of said records.

No references cited.